May 23, 1933.                L. J. McKONE                1,910,903
                          VARIABLE SPEED DRIVE
                    Filed Dec. 17, 1931        2 Sheets-Sheet 1

INVENTOR
LEO J. McKONE
BY Reif & Braddock
ATTORNEYS.

Patented May 23, 1933

1,910,903

UNITED STATES PATENT OFFICE

LEO J. McKONE, OF DETROIT, MICHIGAN

VARIABLE SPEED DRIVE

Application filed December 17, 1931. Serial No. 581,545.

This invention relates to a variable speed drive and particularly to a variable hydraulic drive. While the invention might have various applications, it is illustrated and described as used in combination with an internal combustion engine or motor such as the ordinary automobile motor. As is well known in the ordinary automobile construction a clutch usually of the disk type is used to connect the motor to the transmission shaft. Care must be exercised in permitting engagement of the clutch, and it is detrimental to the clutch to slide the same or permit frictional relative motion between the parts thereof. The driver often desires to do this but such operation heats the disks and damages the clutch. The engagement of the clutch also often produces a shock giving a jerk to the car.

It is an object of this invention, therefore, to provide a clutch and transmission mechanism by means of which connection can be made between the motor and the transmission shaft without any jar or shock, and by means of which the transmission shaft can be driven at various speeds from the motor.

It is another object of the invention to provide an automobile engine having a variable speed hydraulic clutch driven thereby and constructed and arranged to connect the same to the transmission shaft and drive the latter at various speeds, said clutch also being provided with a brake.

It is another object of the invention to provide an automobile structure comprising a motor having a rotating portion, a pump, means on said rotating portion for driving said pump, a transmission shaft, a member secured to said shaft through which fluid is passed by said pump, and means for obstructing the path of said fluid whereby said portion and transmission shaft will be revolved with said rotating portion.

It is still another object of the invention to provide an automobile construction comprising a motor having a rotating part, a pump driven from said rotating part, a transmission shaft, means carried by said shaft through which fluid is circulated by said pump, means for obstructing said fluid to give rotation of said shaft by said rotating portion, a clutch member carried by said rotating portion, and a complemental clutch member connected to said shaft and movable into engagement with said clutch member whereby a positive mechanical connection and drive can be had between said rotating portion and shaft.

It is still a further object of the invention to provide an automobile construction comprising a motor having a rotating portion at one end, a fluid actuated clutch mechanism, a transmission shaft extending from said motor, means for controlling said clutch to connect said rotating portion and transmission shaft, and a brake mechanism operable in connection with said clutch.

It is more specifically an object of the invention to provide an automobile structure comprising a motor having a rotating portion such as a fly wheel at one end, an annular gear carried by said fly wheel, a planetary pinion meshing with said gear, a pump driven by said planetary gear, a transmission shaft extending from said motor, a member connected to said shaft through which fluid is passed by said pump, and a movable operating member for obstructing the flow of said fluid to connect said member and fly wheel whereby said transmission shaft can be driven at various speeds by said fluid.

These and other objects and advantages of the invention will be fully set forth in the following description made in connection with the accompanying drawings, in which like reference characters refer to similar parts throughout the several views and in which:—

Figures 1, 2:
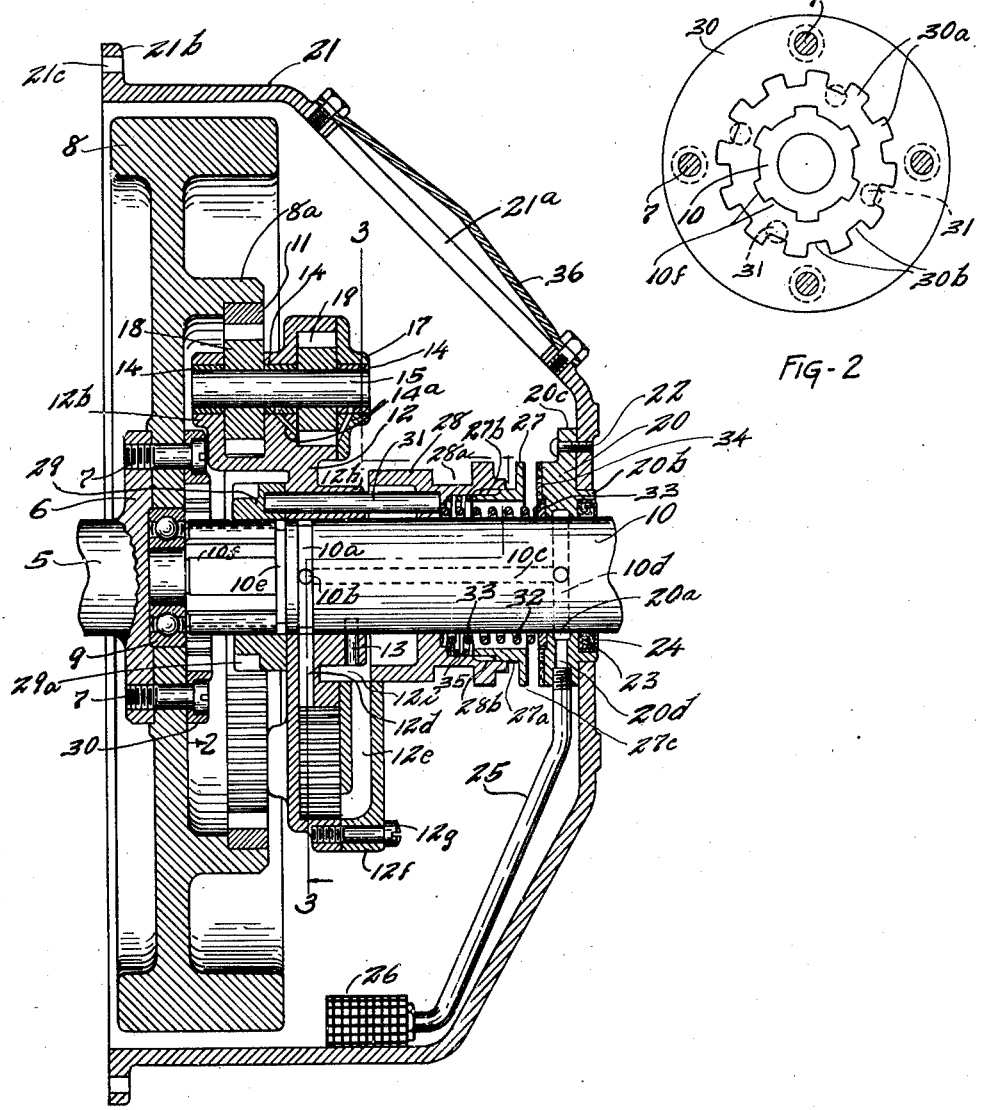
Fig. 1 is a vertical section taken on line 1—1 of Fig. 3.
Fig. 2 is a vertical section taken on line 2—2 of Fig. 1.
Figure 3:
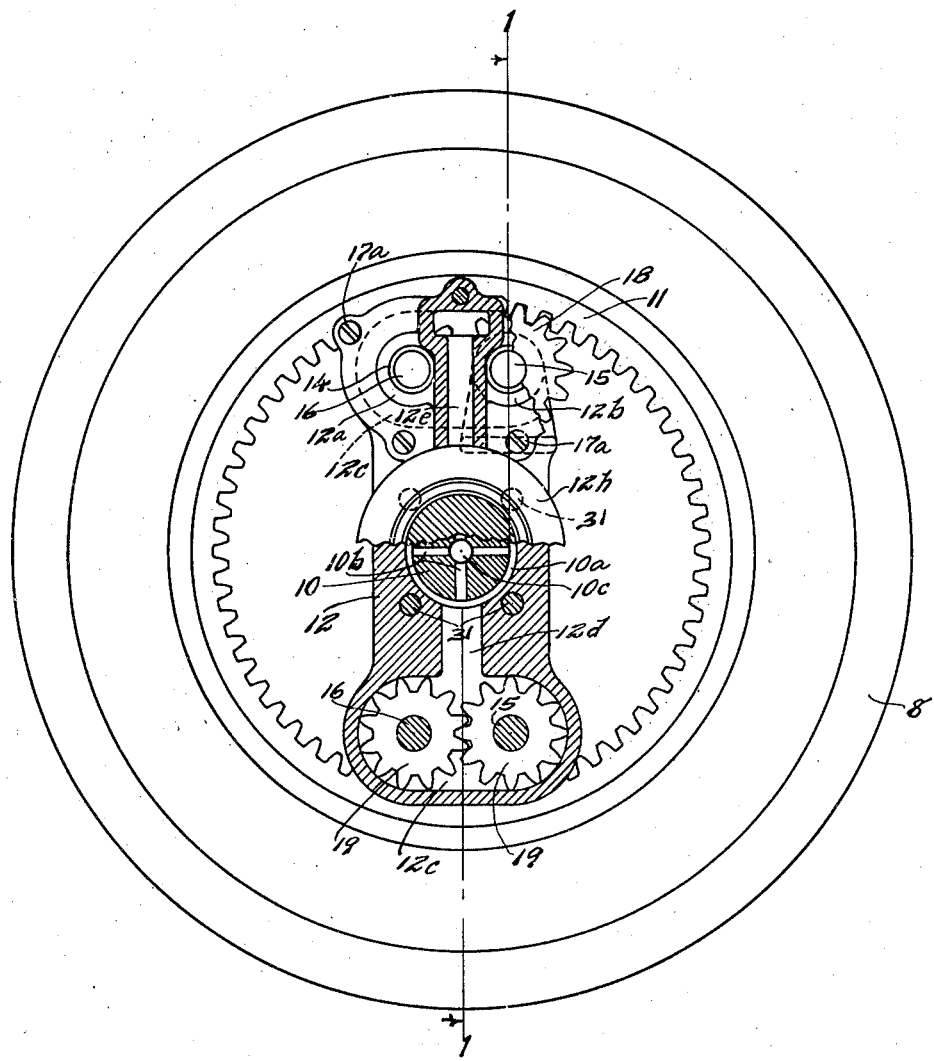
Fig. 3 is a vertical section taken on line 3—3 of Fig. 1.

Referring to the drawings, a portion of an automobile motor is shown comprising the crank shaft 5 having a disk-like flange 6 at one end to which is secured by the headed screw 7 the usual fly wheel 8. Said fly wheel is recessed at its central portion to receive a ball bearing 9 in which is journaled one end of the transmission shaft 10 extending from said fly wheel coaxial with the shaft 5 and said fly wheel. Said fly wheel 8 has a cylindrical flange 8a projecting rearwardly therefrom into which is secured an annular internal gear 11. A member 12 is mounted on shaft 10 and secured thereto by a plurality of pins 13. Said member extends to opposite sides of shaft 10 and has bearing portions 12a and 12b formed therein at each side of said shaft in which are fitted bushings 14. A shaft 15 is journaled in the bushings in bearing portion 12b at each side of said member or at opposite sides of shaft 10, and another shaft 16 is journaled in the bushings in the bearing portions 12a at each side of shaft 10. Member 12 has cap members or cover members 17 secured thereto by spaced screws 17a having hubs in which are also secured bushings 14 and in which shafts 15 and 16 are also journaled. One shaft 15 and one shaft 16 has secured thereto a pinion 18 meshing with gear 11. The member 12 has formed therein oblong chambers 12c having cylindrical end portions and pump gears 19 are disposed in said chambers coaxial with the cylindrical end portions thereof and secured to the shafts 15 and 16 respectively. The gears 19 in the respective chambers 12c mesh with each other and the rotation is such that the meshing teeth move from the inner portion to the outer portion of member 12. Oil passages 14a lead from chambers 12c to and through bushings 14. The member 12 has passages 12d leading from the inner side of passages 12c centrally thereof to the cylindrical bore surrounding shaft 10. Said shaft has an annular groove 10a formed therein in alinement with passages 12d and radial passages 10b lead from the groove 10a inward to a central bore or passage 10c in shaft 10 which extends rearwardly of said shaft and has another set of radial passages 10d leading outward therefrom which communicate with an annular groove 20a formed in a member 20 bored to fit on shaft 10 and having a cylindrical flange 20b projecting through a casing 21, said flange being coaxial with the shaft 10. Member 20 also has a projecting disk-like flange 20c fitting against the inner side of casing 21 at the outer side of flange 20b and said flange 20c is bolted to the casing 21 by the headed screws 22. Packing material 23 surrounded by a thin enclosing washer 24 is secured within flange 20b about the shaft 10. A pipe or tube 25 extends from the lower side of member 20 downward to the bottom of casing 21 where it is connected to a semi-cylindrical screen member 26. Member 20 has a passage 20d communicating with said tube and with the groove 20a. A member 27 is provided forwardly of member 20 having a forwardly extending hub 27a which has formed in its periphery circumferentially spaced ribs and grooves 27b. Member 27 has an outwardly extending disk-like flange 27c having a flat rear surface. A member 28 is provided surrounding and slidable on the shaft 10 and this member has a rearwardly projecting cylindrical portion having a circumferential groove 28a in its periphery and having an enlarged bore therein at its rear end, the rear portion of said member 28 surrounding portion 27a and having circumferentially spaced grooves and ribs 28b formed on the inner surface of said bore, which ribs mesh with the ribs and grooves 27b and are slidable therein. Member 28 is adapted to be engaged by a clutch fork (not shown) seating in groove 28a so that member 28 can be moved forwardly and rearwardly on shaft 10. Member 12 has a removable portion 12f secured thereto by the screws 12g and said portion has formed therein central passages 12e leading from the rear and outer ends of chambers 12c inwardly to partially annular grooves 12i. The grooves 12i surround the hub 12h which is secured to shaft 10. Said partially annular groove 12i opens into the casing 21. Member 12 is bored at its rear end to receive the front end of member 28 which front end is in the form of an annular flange and the inner side of this annular flange fits snugly about the hub of member 12. Shaft 10 forwardly of member 12 is provided with an annular groove 10e and forwardly of said groove said shaft is provided with circumferentially spaced shallow grooves and ribs 10f. A member 29 surrounds shaft 10 and is provided with similar circumferentially spaced grooves and ribs so that it is splined to shaft 10. Said member 29 at its forward end has formed in its periphery spaced ribs and grooves 29a. A member 30 is secured to the rear side of fly wheel 8 within flange 8a by the screws 7, said screws having their heads countersunk into member 30, and said member has a central opening having formed on the wall thereof spaced grooves 30a thus forming therebetween the ribs 30b. The grooves and ribs 30a and 30b are similar to and adapted to receive the spaced ribs and grooves 29a on member 29. Member 29 is bored to receive a plunger rod 31 slidable through a bore in member 12 and secured at its other end in member 28. Member 28 is bored at its rear end to receive the compression coil spring 32 surrounding shaft 10, the forward end of which bears against a washer 33 seated against member 20. The forward end of member 20 has a flat annular surface as shown in Fig. 1 and a fiber disk 34 of annular shape engages this surface and is adapted to be engaged by the rear face of member 27. A compression coil spring 35 is also disposed in the bore at the rear end of member 28 engaging said member and engaging at its rear side the forward end of member 27. Casing 21 has an opening 21a at its top over which is bolted a plate-like cover 36. Casing 21 has an annular flange 21b at its forward end having circumferentially spaced bolt holes 21c therein by which it will be bolted to the end of the motor frame.

In operation, the motor will be run as usual and shaft 5 and fly wheel 8 will revolve. There will be considerable oil in the case 21, which, as stated, will be connected to the crank case of the motor. The revolution of fly wheel 8 turns the gear 11 and the pinions 18 are rotated. This rotates the shafts 15 and 16 and the gears 19 thereon are driven and these gears intermesh and revolve towards each other from the inner side of member 12 toward the outer side and thus act to pump oil through the passage 12d. This draws oil through the passages 10b, 10c and 10d and through the conduit 25 through strainer 26. Both pairs of gears 19 with the chamber 12c constitute a pump and oil is thus pumped from both sides of groove 10a and this oil is passed out from both chambers save through the passages 12e. Member 27 is normally in the position shown in Fig. 1 or slightly farther to the rear and when in this position, the oil passing through passages 12e can simply pass out at the inner ends of said passages into the casing 21. As stated, member 28 will be embraced by a clutch fork which will be connected to the clutch pedal of the automobile. As usual, this lever will be pressed down when the motor is started. When the clutch pedal is released, spring 32 will move member 28 toward fly wheel 8. This member will move over hub 12h and will progressively close the opening 12e. When opening 12e is partially closed so that all of the oil cannot escape through its open end, member 12 will begin to revolve and turn shaft 10. The oil in member 12 acts as a coupling between gear 11 and member 12 to drive the latter. If member 28 is allowed to move forwardly sufficiently to entirely close passages 12e, member 12 will move at substantially the same speed as fly wheel 8 and shaft 10 will be driven at substantially the same speed as the motor. The farther rearward member 28 is, the greater will be the difference of speed between the motor and shaft 10. If member 28 is allowed to move forward as far as possible, plunger 31 moves member 29 forwardly and the teeth 29a thereon mesh with the teeth 30b on member 30 so that members 29 and 30 are locked and member 29 will be positively rotated by member 30 and shaft 10 will thus be driven by the fly wheel 8 through a positive mechanical connection and the stress will be taken off of the pump. When the clutch pedal is pushed downward and member 28 is moved rearwardly, member 27 is moved rearwardly by compression of spring 35 and the flat rear end of member 27 presses the pedal disk 34 against the front flat face of member 20, thus acting to stop the rotation of shaft 10. Member 27, of course, is rotatably fixed with relation to member 28 by the engaging teeth on members 27 and 28. Access can, of course, be had to casing 21 by the removal of cover 36.

From the above description it is seen that applicant has provided a variable speed hydraulic connection or clutch between the fly wheel 8 and shaft 10. When the clutch is allowed to engage by movement of member 28 forwardly after the motor has been started, shaft 10 will be started in revolution with no shock or jar. As member 28 moves forwardly, the speed of shaft 10 will increase and any desired speed can be had up to the full speed of the motor. It will be seen that the motor can be used as a brake for the automobile to any desired degree, from a slight engagement of the clutch to a full engagement thereof. This can be done without any damage to any of the parts. As stated, when member 28 is at its most forward position, the members 29 and 30 engage and a positive mechanical drive is secured.

It will be seen that the gears 18 and thus the pump gears are driven at three times the speed of the motor or fly wheel 8. This results in an adequate supply of oil at all times and at all speeds of fly wheel 8. Should the motor slow down, there will be no noticeable diminution in the oil supply since the pumps will be rotating with sufficient speed to keep the oil passages full. If the pumps were driven at the same speed as the fly wheel, there would be danger of lack of oil at the slow motor speeds, so that there would be a lag on the engagement of the clutch or lost motion so to speak, between the motor and the transmission shaft.

On lighter cars there will be no need of the usual change speed gears in the transmission. On heavier cars such as trucks and busses, the drive can be used with the usual change speed gears and fewer speeds will be necessary. On such cars the brake formed by members 20 and 27 will be of great advantage as shaft 10 will be reduced in speed by the brake and an easy and quiet meshing of the gears will be secured.

It will be noted that oil will be forced under pressure from the chambers 12c through the passages 14a to lubricate the bearings for the shafts 15 and 16.

It will, of course, be understood that various changes may be made in the form, details, arrangement and proportions of the parts without departing from the scope of applicant's invention which generally stated, consists in a device capable of carrying out the objects above set forth, in the parts and combinations of parts disclosed and defined in the appended claims.

What is claimed is:—

1. An automobile structure having in combination, a motor having a rotating part, an internal gear secured to said part, a transmission shaft extending to said motor, a fluid operated means carried by said shaft including a pump having pumping elements rotative about axes parallel to said shaft, gears for driving said pump elements meshing with said internal gear, and means cooperating with said fluid operated means for causing the same to drive said shaft from said motor.

2. An automobile structure having in combination, a motor having a fly wheel at its rear end, a transmission shaft extending to said fly wheel, means secured to and carried by said shaft including a plurality of gear pumps, an internal spur gear secured to said fly wheel for driving said pumps to propel fluid through said means, said pumps having shafts carrying pump gears and having spur pinions secured thereto meshing with said internal gear, said last mentioned shafts being parallel to said transmission shafts and means surrounding said transmission shaft and supported thereby movable to different positions under the control of the driver for obstructing the flow of said fluid and causing said first mentioned means to drive said shaft at different speeds.

3. An automobile structure having in combination, a motor having a fly wheel thereon, a spur gear secured to said fly wheel, a stationary casing surrounding said fly wheel, a transmission shaft extending to said fly wheel, a member having a passage therethrough extending radially from said shaft and having a pump therein at its outer end constructed and arranged to rotate and pump oil from said casing and force the same through said passage back into said casing, a driving spur pinion for said pump meshing with said spur gear, a member slidable on said shaft for obstructing the flow of oil through said passage, a spring normally tending to move said member to obstructing position, said member being adapted to be moved by the clutch pedal of said automobile.

4. An automobile structure having in combination, a motor having a rotating part, a transmission shaft extending to said rotating part, a member secured to and carried by said shaft having passages extending outwardly from said shaft terminating in chambers at opposite sides of said shaft, meshing gears in each of said chambers forming pumps, a shaft projecting from one of the gears of each pair, a pinion secured to said shaft for driving said gears, a spur gear on said rotating part meshing with said pinions for driving the same, discharge passages in said member leading from said pumps respectively inwardly toward said transmission shaft, and a member slidable on said shaft for obstructing the flow of fluid in said passages for causing said member to drive said shaft.

5. An automobile structure having in combination, a motor having a rotating part, a spur gear secured to said portion, a transmission shaft extending to said rotating part, a member secured to and carried by said shaft having chambers at opposite sides of said shaft, a pair of meshing gears mounted in each of said chambers constituting a pump, spur pinions for driving said gears from said rotating part meshing with said spur gear, said member having passages leading outwardly from said shaft forming intake passages for said pump, a passage extending through said shaft communicating with said passages, an intake conduit for oil also communicating with the passage in said shaft, discharge passages in said member leading from said pumps toward said shaft, and a member movable on said shaft under the control of the driver for obstructing said discharge passages to cause said member to drive said shaft.

6. An automobile structure having in combination, a motor having a rotating part, a spur gear secured to said part coaxial therewith, a transmission shaft extending to said motor, a member secured to said shaft having a passage extending outwardly from said shaft, a chamber at the outer end of said passage, a pump in said chamber having a rotating pumping element, a spur pinion for driving said element meshing with said spur gear, a stationary casing containing oil in which said parts are disposed, and an inlet means for said pump for pumping oil from said casing to said chamber, said member having a discharge passage leading to said casing, and means for obstructing said passage to drive said transmission shaft through said member.

7. An automobile structure having in combination, a motor, a fly wheel connected to said motor, an internal gear connected to said fly wheel, a transmission shaft extending to said fly wheel, a member carried by said shaft having passages extending outwardly from said shaft and communicating with a chamber in said member, a rotating pump element in said chamber, a spur pinion connected to said element for driving the same and meshing with said internal spur gear, one of said passages in said member forming an outlet passage from said chamber through which oil is forced by said pumping element, and means for obstructing said passage to cause said member to drive said shaft from said fly wheel.

8. The structure set forth in claim 7, a clutch member splined to said shaft for movement longitudinally thereof, and a cooperating clutch element secured to said fly wheel, and means for moving said first mentioned clutch element to positively connect said fly wheel and shaft.

9. An automobile structure having in combination, a motor having a rotating part, a fly wheel secured to said part, a spur gear secured to said fly wheel, a member secured to said shaft having passages leading outwardly from said shaft, a chamber with which said passages communicate, a shaft journaled in said member, a pumping element secured to said shaft and disposed in said chamber, a spur pinion secured to said shaft and meshing with said spur gear, a stationary casing surrounding said parts adapted to contain oil, means for supplying oil from said casing to one of said passages in said member, the other passage in said member forming an outlet passage, a member surrounding said transmission shaft and movable longitudinally thereof for obstructing said outlet passage to cause rotation of said transmission shaft from said fly wheel.

10. An automobile structure having in combination, a motor having a driving shaft, a fly wheel secured to said shaft, a transmission shaft extending to said fly wheel, an internal spur gear secured to said fly wheel, a member carried by said shaft having a pump therein, a pinion meshing with said spur gear for driving said pump, said member having an outlet passage from said pump, a member movable longitudinally of said transmission shaft to obstruct said outlet passage and cause rotation of said transmission shaft from said fly wheel, a clutch means secured to said fly wheel, a second clutch member connected to said transmission shaft movable into engagement with said clutch to positively connect said shaft and fly wheel, and means for moving said second clutch means actuated by said last mentioned member.

11. An automobile structure having in combination, a stationary casing, a motor having a fly wheel, a spur gear secured to said fly wheel, a member carried by said transmission shaft including rotating pumping means and having inlet and outlet passages leading from said casing to said pumping means, a spur pinion for driving said pumping means carried by said member and meshing with said spur gear, a clutch for connecting said transmission shaft to said fly wheel, a braking means cooperating with said casing for stopping rotation of said transmission shaft and parts carried thereby, and a member carried by said transmission shaft and movable longitudinally thereof for causing engagement of said clutch and also operating said braking means.

12. The structure set forth in claim 11, said last mentioned member also controlling said outlet passages from said pumping means and causing rotation of said transmission shaft from said fly wheel.

13. An automobile structure having in combination, a motor having a driving shaft, an internal gear secured to said shaft, a transmission shaft extending to said driving shaft, a pinion meshing with said gear, a member supported on said shaft comprising a pump mechanism separate from but driven by said pinion, said member having an outlet passage leading from said pump, and a member surrounding, movable longitudinally of, and closely adjacent said transmission shaft to obstruct said outlet passage and cause rotation of said transmission shaft from said driving shaft.

14. An automobile structure having in combination, a driving shaft, an internal gear secured to said shaft, a driven shaft extending to said shaft, and a variable fluid operating means secured to said driven shaft comprising a plurality of pinions meshing with said internal gear, a member carrying a plurality of pumps separate from but driven from said pinions, a member surrounding said driven shaft and closely adjacent thereto cooperating with said pumps to obstruct the discharge of fluid therefrom and cause said driven shaft to be driven by said driving shaft, and a stationary casing surrounding said parts and containing oil to be circulated by said pump.

15. An automobile structure having in combination, a motor having a driving shaft, a gear secured to said driving shaft, a clutch element secured to said shaft, a driven shaft, a member secured to said driven shaft having a pump mechanism therein having discharge passages, pinions carried by said member separate from but supporting said pump mechanism and meshing with said gear, and means movable longitudinally of said driven shaft for obstructing said discharge passages and causing said driving shaft to drive said driven shaft through said pump mechanism and member, a second clutch element secured to said member, and means for engaging said clutch elements to positively drive said member and driven shaft from said driving shaft.

16. An automobile structure having in combination, a motor having a driving shaft, a fly wheel secured thereto, an internal gear carried by said fly wheel, a driven shaft, a member supported on said driven shaft and carrying a pump mechanism, a pinion for driving said pump mechanism meshing with said internal gear, said pump mechanism having a discharge passage with a portion closely adjacent said driven shaft and a member surrounding and movable longitudinally of said driven shaft closely adjacent thereto for obstructing said discharge passage and causing said driven shaft to be driven through said member from said driving shaft.

LEO J. McKONE.